United States Patent Office 3,300,260
Patented Jan. 24, 1967

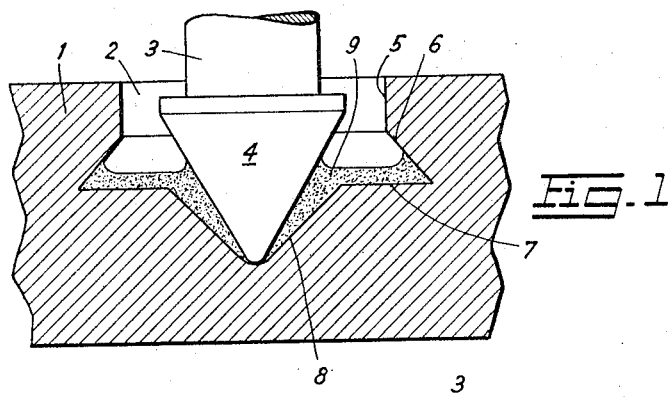
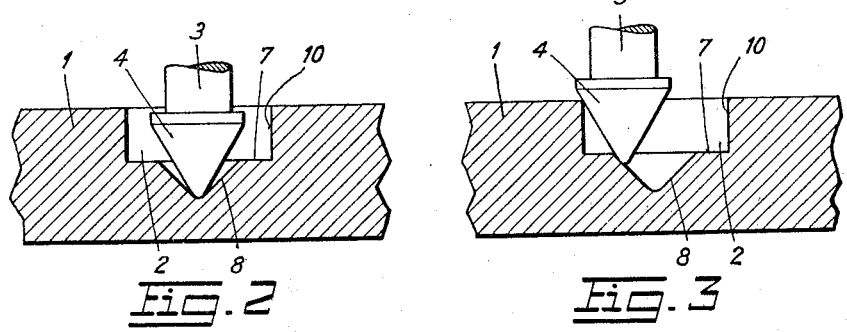
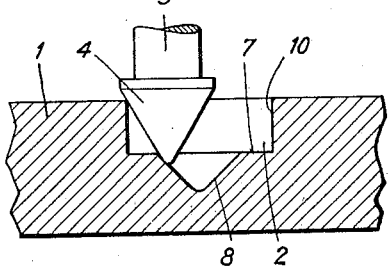
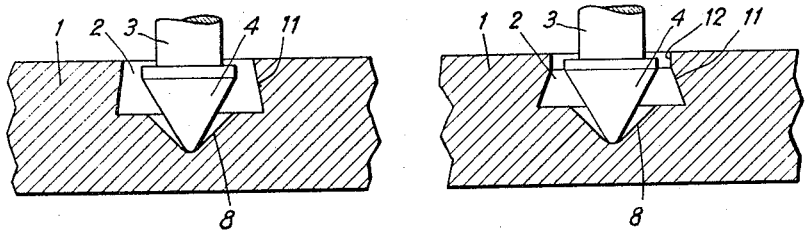
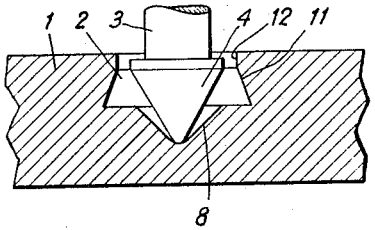
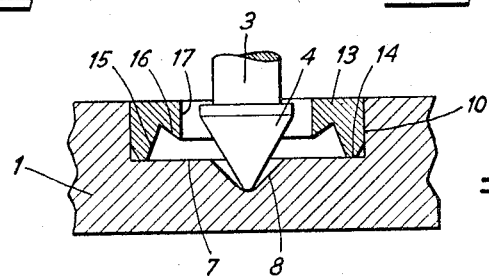

3,300,260
BEARING FOR A STAFF WITH POINTED END
Albert Stern, Granges, Switzerland, assignor to Ebosa S.A., Granges, Switzerland, a limited company
Filed Feb. 12, 1964, Ser. No. 344,341
Claims priority, application Switzerland, Feb. 14, 1963, 1,868/63
3 Claims. (Cl. 308—159)

The present invention relates to a bearing for a staff with conical ends comprising a conical recess for lodging such staff ends.

Bearings of this type are already known. They are used more particularly in the small apparatus industry and in the horological industry, in which such bearings are used in alarm clocks and watches. Very often the portion of the bearing wherein the conical housing is made of synthetic jewel material. It may as well be made of tempered steel. In watches, such known bearings are generally used for pivotally receiving the regulating member. The conical end of the staff of this regulating member may be made stronger than the end of a staff provided with the usual cylindrical or cylindrical-conical pivots. Consequently, such stronger ends have a far better resistance to shocks and it is no more necessary to provide the bearings with dampening devices. Staff with conical ends may be made of an extremely hard material without risk of breaking due to shocks and they have thereby a far better resistance to wear.

In the heretofore known bearings of the above mentioned type the opening angle of the conical recess is slightly superior to the opening angle of the cone of the pivot and the latter normally bears with its tip against the slightly rounded base of the conical housing. When a watch piece is provided with such a bearing the friction conditions vary very slightly only, when the position is changed so that the deviations in running between the different positions of the watch are slighter than is the case of a watch piece provided with bearings and usual pivots.

Unfortunately, the bearings of the above-mentioned type that are known up to now present an important drawback that has hindered their general use. This drawback resides in the fact that the lubricating oil destined to lubricate the tip of the pivot does not remain concentrated in the base of the conical recess but spreads out on the surface of the pivot or on the surface of the recess or on both these surfaces at the same time, so that the contact between the pivot tip and the conical recess is rapidly that of a dry friction.

It is a prime object of the present invention to overcome this drawback. To this end the invention contemplates in a bearing for a staff with pointed ends, having a conical recess for lodging such staff ends, the provision of a capillary reservoir, situated outside of said recess and limited by surface portions of which one extends to the rim of the inner wall of said recess.

Other features and advantages of the invention will become apparent from the description now to follow, of preferred embodiments thereof, given by way of example only, and in which reference will be made to the accompanying drawings, in which:

FIGURE 1 is a sectional view at enlarged scale of a first embodiment,

FIGURES 2 and 3 are sectional views of a second embodiment, whereby the pivot is placed in normal position in FIGURE 2, and in deviated position in FIGURE 3, and FIGURES 4–10 are sectional views of seven further embodiments of bearings in accordance with the present invention.

Figure 7:
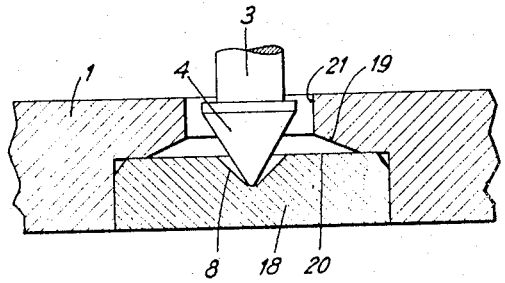

The bearing illustrated in FIGURE 1 is constituted of one piece 1 of cylindrical shape forming a bearing shell. Into one of the plane faces of the shell there is made a recess 2. The sectional shape of this recess is that of a surface of revolution about an axis perpendicular to said plane face and coinciding with that of a staff 3 having a conical end 4 that is supported by the described bearing. The recess 2 is limited by four portions of surfaces of revolution, viz: a cylindrical surface portion 5 limiting the upper part of the recess, a truncated cone surface portion 6 with downwardly directed opening, a plane annular surface portion 7 and a conical surface portion 8 with upwardly directed opening, the latter forming the inner wall of a conical face with rounded tip engaged by the pivot 4. As is visible from FIGURE 1 the opening angle of the pivot 4 is smaller than that of the conical face 8. This conical face 8 is bounded with respect to the annular face 7 by a circular edge, whereby the angle between the generating lines of the faces 7 and 8 is an obtuse angle. The annular surface portion 7 in turn is connected to the truncated cone face 6 by a further circular edge of larger radius, whereby the angle between the generating lines of the surfaces 6 and 7 is smaller than 90°. These two last-mentioned annular surfaces define a capillary reservoir capable of maintaining a certain amount of lubricating oil 9 concentrated in the base of the conical face 8 and in the capillary reservoir 6, 7. Actually this oil under the effect of the surface tension tends to collect in the acute angle between the faces 6 and 7.

It does not spread out along the face 6 beyond a certain limit and constantly lubricates the pivot 4 and the inside of the conical face 8, thereby ensuring an appropriate lubrication of the bearing. When the position of the bearing is modified there will result a certain displacement of the oil, whereby a portion thereof leaves the conical face 8 towards the reservoir 6, 7 and vice versa, so that none of these displacements dry out the bearing.

The cylindrical surface portion 5 of the recess 2 has still a further advantage. Its diameter is selected in such manner that when the tip of the pivot 4 is engaged into the recess 2 to such a depth that it attains the level of face 7, the lateral face of the pivot 4 lying against the upper edge of the face 5, that then the tip of the pivot 4 is exactly at the entrance of the conical surface portion 8. Thus it automatically engages this conical surface 8 so that the positioning of the pivot in the described bearing is highly facilitated.

A similar arrangement is also illustrated by the FIGURES 2 and 3, which represent a bearing that is analogous to the bearing of FIGURE 1 and in which the same elements are designated by the same reference numerals. It may be seen that in this embodiment the capillary reservoir is bounded by a plane annular face 7 and by a cylindrical face 10. The opening angle of this capillary reservoir thus is equal to 90°. The diameter of the cylindrical face 10 is selected the same way as that of the cylindrical face of the embodiment of FIGURE 1.

In the embodiment shown in FIGURE 4 the cylindrical face 10 is replaced by a truncated cone face 11 with downwardly directed opening analogous to the face 10 but extending up to the upper face of the shell 1. The angle and the diameters of this face 11 are again selected in such manner that when the pivot is engaged into the recess 2 that then its tip is automatically guided to the entrance of the housing 8. FIGURE 5 illustrates a modification of the embodiment of FIGURE 4, in which the portion of the cylindrical surface 12 similar to the surface portion 5 upwardly limits the face 11. The capillary reservoir in this embodiment has the same opening angle as that in the embodiment of FIGURE 4.

In FIGURE 6 there is illustrated an embodiment of a bearing according to the present invention which is made of two distinct pieces. The recess of the shell 1 is bounded by a plane annular face 7 and by a cylindrical face 10 as described for the embodiment of FIGURES 2 and 3, but a ring 13 driven into the cylindrical recess limited by the face 10 closes the capillary reservoir laterally and upwardly. To this end this ring 13 has a plane annular inner face 14 resting on the plane face 7, a truncated cone face 15 with downwardly directed opening and a second truncated cone face 16 with upwardly directed opening, the latter being limited by an inner cylindrical face 17 corresponding to the face 5 of the bearing of FIGURE 1. The capillary reservoir in this embodiment thus presents two acute angles the first between the faces 7 and 15 and the second between the faces 15 and 16.

In the embodiment illustrated in FIGURE 7 the shell 1 again forms only one part of the bearing. It is traversed from end to end by an opening coaxial to the pivot 4. In its lower portion this opening forms a cylindrical housing into which is driven a block or footstep 18 of corresponding shape one end face of this block being provided with the housing 8. This block is made of beryllium-bronze thermically treated so that its hardness attains 400 Vickers units. Of course this block could also be made of tempered steel. The upper part of the opening of the shell 1 has a truncated cone face 19 with downwardly directed opening the lower edge of which contacts the upper face 20 of the block 18, and a cylindrical face 21 which serves the same purpose as the cylindrical face 5.

The shape of the bearing is the same as that of the bearing of FIGURE 1 but the possibility of using a block or footstep a distinct cylindrical element constitutes an advantage with respect to the bearing of one piece shown in FIGURE 1. The capillary reservoir is bounded by the face 20 of block 18 and by the face 19 of shell 1.

Figure 8:
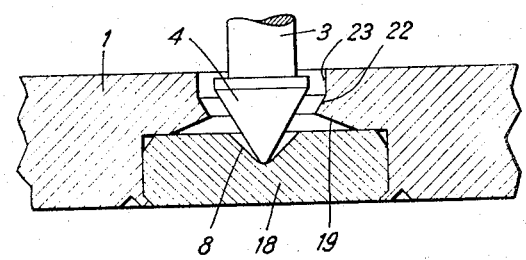

Instead of being driven into the shell 1 the block 18 could also be set as shown for example in the embodiment of FIGURE 8. The modification represented in this last-mentioned figure comprises the same elements as the embodiment of FIGURE 7. The capillary reservoir more particularly has the same shape. It is to be noted, however, that the upper edge of the face 19 of the capillary reservoir is not adjacent to the cylindrical surface 21 but to a truncated cone surface 22 with upwardly directed opening, which in turn joins a cylindrical surface 23 extending up to the upper face of the shell 1. This arrangement affords for the possibility to extend the upper face of the capillary reservoir in direction of the axis without reducing the possibility of lateral displacement of the pivot 4.

Figure 9:
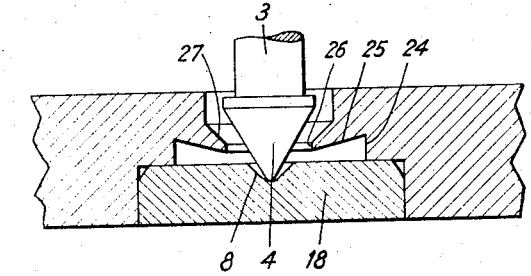

FIGURE 9 represents an embodiment in which the upper face of the capillary reservoir extends even closer to the axis of the bearing. The bearing illustrated in FIGURE 9 also comprises a shell 1 and a block or footstep 18 driven into a cylindrical opening of the shell 1, but the capillary reservoir is bounded by a cylindrical face 24 the lower edge of which contacts the upper face of the block 18 and by a truncated cone face 25 with upwardly directed opening. This latter face forms together with the upper face of the footstep or block 18 an angle, the opening of which is directed towards the periphery of the shell 1. The upper face 25 is adjacent to a cylindrical face 26 of small height which in turn is adjacent to a truncated cone face 27 with upwardly directed opening that is placed as is the face 22 of the bearing of FIGURE 8.

The annular rim limited by the faces 25, 26 and 27 almost completely closes the capillary reservoir of the described bearing while still affording for lateral displacement of the pivot 4 as long as the tip thereof remains within the housing 8. As is visible from FIGURE 9 this housing is of substantially smaller depth as is the housing of FIGURE 8.

Figure 10:
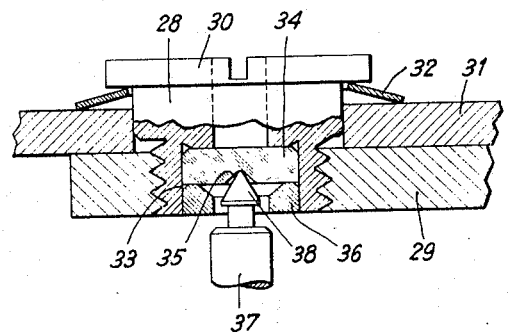

Finally FIGURE 10 illustrates the upper bearing of the regulating member of a watch piece. This bearing comprises a support 28 of cylindrical shape comprising an outer thread and screwed into a frame member 29 of this watch. A collar 30 of the support 28 holds a regulator, into an opening of which the support is engaged and is held against this regulator by means of an annular spring 32. The support 28 presents a cylindrical housing 33 in which are engaged a footstep 34 of synthetic jewel material the inner face of which forms a conical housing 35 and a rim 36 the inner walls of which are of same shape and arrangement as are the faces 19 and 21 of the shell 1 of the embodiment of FIGURE 7. The regulating member of the watch piece is mounted on a staff 37 presenting at its upper end a pivot with conical tip 38. The support 28 may be more or less threaded into the element 29 thereby affording for a precise adjustment of the axial play of the staff 38.

I claim:
1. In combination with a staff having a generally pointed end; a bearing including a body having a recess including a conical portion receiving the pointed end of the shaft; said conical recess portion being defined by side surfaces extending upwardly and outwardly and forming an angle greater than the angle formed by opposite portions of said pointed end, said body including a first annular surface surrounding said conical recess portion, means including a second annular surface overlying said first annular surface and extending at an acute angle to said first annular surface to define therewith a capillary reservoir, the diameter of an upper portion of said recess above said conical recess portion being such that when the pointed end of the shaft is at the level of said first annular surface and the lateral face of said shaft end is against the upper edge of said upper portion of the recess, the pointed end will be at the entrance of the conical recess portion, and a lubricating substance located in said conical recess portion and said reservoir with the reservoir serving to maintain a predetermined sufficient amount of the lubricating substance in said conical recess portion for lubricating said pointed end of said shaft.

2. The combination defined in claim 1 wherein said means is integral with said body.

3. The combination defined in claim 1 wherein said means is a ringlike member formed separately from said body.

References Cited by the Examiner

UNITED STATES PATENTS

| 1,546,075 | 7/1925 | Horn | 58—140 |
| 2,537,200 | 1/1951 | Zar | 308—159 |

FOREIGN PATENTS

| 1,333,053 | 6/1963 | France. |
| 896,030 | 7/1949 | Germany. |
| 913,341 | 12/1962 | Great Britain. |
| 230,295 | 3/1944 | Switzerland. |

MARTIN P. SCHWADRON, *Primary Examiner.*

FRANK SUSKO, DAVID J. WILLIAMOWSKY,

*Examiners.*